(12) United States Patent
Yap et al.

(10) Patent No.: US 9,275,358 B1
(45) Date of Patent: Mar. 1, 2016

(54) SYSTEM, METHOD, AND COMPUTER PROGRAM FOR AUTOMATICALLY CREATING AND SUBMITTING DEFECT INFORMATION ASSOCIATED WITH DEFECTS IDENTIFIED DURING A SOFTWARE DEVELOPMENT LIFECYCLE TO A DEFECT TRACKING SYSTEM

(71) Applicant: Amdocs Software Systems Limited, Dublin (IE)

(72) Inventors: Mun Roy Yap, Seattle, WA (US); Tatiana Zagorovski-Pambuk, Chesterfield, MO (US); Robert J. Jones, Palm Bay, FL (US)

(73) Assignee: Amdocs Software Systems Limited, Dublin (IE)

( * ) Notice: Subject to any disclaimer, the term of this patent is extended or adjusted under 35 U.S.C. 154(b) by 0 days.

(21) Appl. No.: 14/525,051

(22) Filed: Oct. 27, 2014

(51) Int. Cl.
*G06Q 10/06* (2012.01)
*G06F 9/44* (2006.01)
*G06Q 10/10* (2012.01)

(52) U.S. Cl.
CPC ........ *G06Q 10/06* (2013.01); *G06F 8/20* (2013.01); *G06Q 10/10* (2013.01)

(58) Field of Classification Search
None
See application file for complete search history.

(56) References Cited

U.S. PATENT DOCUMENTS

| | | | | |
|---|---|---|---|---|
| 6,601,233 B1 * | 7/2003 | Underwood | ............. | G06F 8/24 717/100 |
| 7,234,131 B1 * | 6/2007 | Speyrer | ................. | G06Q 10/06 705/7.42 |
| 9,015,664 B2 * | 4/2015 | Supplisson | ........... | G06F 11/362 717/121 |
| 2006/0168569 A1 * | 7/2006 | Smith | ................ | G06F 11/3672 717/124 |
| 2010/0333066 A1 * | 12/2010 | Feniello | .............. | G06F 11/0748 717/120 |
| 2011/0321007 A1 * | 12/2011 | Marum | ..................... | G06F 8/65 717/113 |
| 2012/0198414 A1 * | 8/2012 | Chen | ..................... | G06Q 50/01 717/102 |

\* cited by examiner

*Primary Examiner* — Don Wong
*Assistant Examiner* — Shirin Alizadeh
(74) *Attorney, Agent, or Firm* — Zilka-Kotab, PC

(57) ABSTRACT

A system, method, and computer program product are provided for automatically creating and submitting defect information associated with defects identified during a software development lifecycle to a defect tracking system. In use, creation of a defect ticket is initiated for an identified defect for submission to a defect tracking system, the identified defect being identified during a software development life cycle. Additionally, a list of potential originating teams from which the identified defect was potentially identified is presented, the list of potential originating teams being presented in a user selectable format. Further, a list of teams in which to assign the identified defect is presented, the list of teams in which to assign the identified defect being presented in a user selectable format. Furthermore, a user selected originating team and a user selected team in which to assign the identified defect is identified. Additionally, details associated with the identified defect are collected from one or more data sources. Further, a description associated with the identified defect is generated utilizing the details associated with the identified defect. Moreover, the defect ticket is generated for the identified defect utilizing the identified user selected originating team, the identified user selected team in which to assign the identified defect, and the generated description associated with the identified defect.

14 Claims, 5 Drawing Sheets

Defect Creator

Defect Options ▼ 1410 SAT1A1 FIE OMS ▼ 1410 CRMT28 FIE ▼ FIE CTEM

Search U-verse BAN | 1526010309 | [Get Details]

| Customer, Scenario & Test Details | Order & Assignment Details |

Order Details | Assignment Details

| U-verse BAN | Due Date | Assigned to UUID | Originating App |
|---|---|---|---|
| 152601039 | 08/26/2014 | vg5154 | Consumer IT E2E U-verse ▼ |

| Order ID | Circuit ID | Assigned to App | Impacting Indicator |
|---|---|---|---|
| 712680073 ▼ | AB/MCXX/507719/SW | LS-OMS ▼ | Consumer IT E2E U-verse ▼ |

| Order Action ID | Network Type | Assigned To Team | Type |
|---|---|---|---|
| 712680778 ▼ | FTTN | Vendor ▼ | Defect ▼ |

| Order Type | RG Serial # | Assigned To Sub Team | Status |
|---|---|---|---|
| Provide ▼ |  | LS_OMS ▼ | New ▼ |

| Activity | STB Model # | Vendor | Severity |
|---|---|---|---|
| Logon |  | Amdocs ▼ | Blocking ▼ |

| Interface | Defect Timestamp | Related Defect (Ticket #) | Triage Status |
|---|---|---|---|
|  | 2014/08/27 16:38 |  | E2E Triage No Involvement ▼ |

| Cart ID |  | Outage |
|---|---|---|

ACS or CSI Conversation ID

URL/Link

Consumer IT E2E U-verse - Release_2014_Sep_thru_Dec

SYSTEM, METHOD, AND COMPUTER PROGRAM FOR AUTOMATICALLY CREATING AND SUBMITTING DEFECT INFORMATION ASSOCIATED WITH DEFECTS IDENTIFIED DURING A SOFTWARE DEVELOPMENT LIFECYCLE TO A DEFECT TRACKING SYSTEM

FIELD OF THE INVENTION

The present invention relates to software development life cycles and more particularly to automatically submitting defect information associated with defects identified during the software development lifecycle to a defect tracking system.

BACKGROUND

Tracking defects discovered during a software development life cycle in a tracking system is a common practice for any company involved in development or utilization of software products. Each tracking system contains multiple fields that have to be populated when logging a defect.

In complex large-scale software projects, one defect tracking system can be used by hundreds of various teams for hundreds of different software projects and applications. Such a tracking system can have a large amount of fields with long lists of valid values a user has to populate to log a defect.

Currently, users manually log defects into tracking systems. This allows for the potential misses of important technical information, such as data from applications' databases, and potential human errors, such as missing values for important fields that are not setup as mandatory in the tracking system, thus leading to cases where opened defects do not have the necessary details required to perform an analysis.

There is thus a need for addressing these and/or other issues associated with the prior art.

SUMMARY

A system, method, and computer program product are provided for automatically creating and submitting defect information associated with defects identified during a software development lifecycle to a defect tracking system. In use, creation of a defect ticket is initiated for an identified defect for submission to a defect tracking system, the identified defect being identified during a software development life cycle. Additionally, a list of potential originating teams from which the identified defect was potentially identified is presented, the list of potential originating teams being presented in a user selectable format. Further, a list of teams in which to assign the identified defect is presented, the list of teams in which to assign the identified defect being presented in a user selectable format. Furthermore, a user selected originating team and a user selected team in which to assign the identified defect is identified. Additionally, details associated with the identified defect are collected from one or more data sources. Further, a description associated with the identified defect is generated utilizing the details associated with the identified defect. Moreover, the defect ticket is generated for the identified defect utilizing the identified user selected originating team, the identified user selected team in which to assign the identified defect, and the generated description associated with the identified defect.

BRIEF DESCRIPTION OF THE DRAWINGS

FIG. 3 illustrates a user interface for automatically creating and submitting defect information associated with defects identified during a software development lifecycle, in accordance with one embodiment.

DETAILED DESCRIPTION

Figure 1:
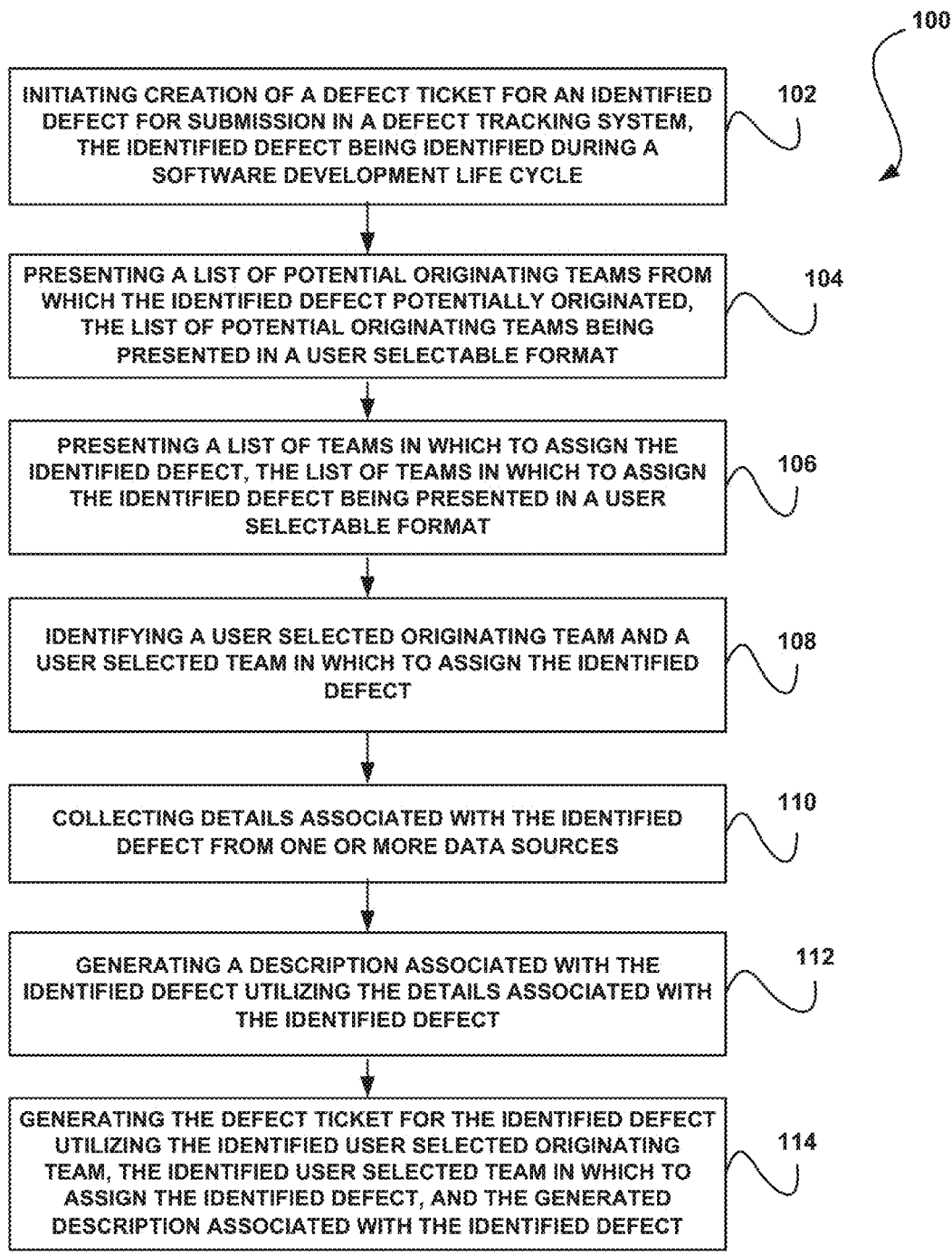
FIG. 1 illustrates a method for automatically creating and submitting defect information associated with defects identified during a software development lifecycle, in accordance with one embodiment.

FIG. 1 illustrates a method 100 for automatically creating and submitting defect information associated with defects identified during a software development lifecycle, in accordance with one embodiment.

As shown, creation of a defect ticket is initiated for an identified defect for submission to a defect tracking system. See operation 102. The identified defect is identified during a software development life cycle. The defect ticket may include any description associated with a defect.

Additionally, the defect tracking system may include any software and/or system capable of tracking defects. Further, the identified defect may include any identified issue and/or an identified bug associated with software in the software development life cycle.

As shown further in FIG. 1, a list of potential originating teams from which the identified defect was potentially identified is presented (e.g. utilizing a user interface). See operation 104. The list of potential originating teams is presented in a user selectable format. The teams may represent one or more individuals and/or organizations.

In one embodiment, the list of potential originating teams from which the identified defect was potentially identified may include teams that are regularly used for a software development project. Further, in one embodiment, the list of potential originating teams may be presented as a dropdown list allowing selection of one or more specific teams. Of course, the list of potential originating teams may be presented in a variety of formats, In one embodiment, fields associated with the list of potential originating teams may be presented for a user to populate. In this case, the fields associated with the list of potential originating teams may be populated utilizing selectable valid values and/or utilizing text entry.

Further, a list of teams in which to assign the identified defect is presented. See operation 106. The list of teams in which to assign the identified defect is presented in a user selectable format. The teams may represent one or more individuals and/or organizations.

In one embodiment, the list of teams in which to assign the identified defect may include teams that are regularly used for a software development project. Further, in one embodiment, the list of teams in which to assign the identified defect may be presented as a dropdown list allowing selection of one or more specific teams. Of course, the list of teams in which to assign the identified defect may be presented in a variety of formats.

In one embodiment, fields associated with the list of teams in which to assign the identified defect may be presented for a user to populate. In this case, the fields associated with the list of teams in which to assign the identified defect may be populated utilizing selectable valid values and/or utilizing text entry.

In one embodiment, an option may be presented for a user to generate an originating team not presented in the list of potential originating teams and an option for the user to generate a team in which to assign the identified defect that is not presented in the list of teams in which to assign the identified defect.

Additionally, in one embodiment, presenting the option for the user to generate the originating team not presented in the list of potential originating teams and the option for the user to generate the team in which to assign the identified defect that is not presented in the list of teams in which to assign the identified defect may include presenting an interface for the user to enter text. In another embodiment, additional team options may be presented to the user.

Furthermore, a user selected originating team and a user selected team in which to assign the identified defect is identified. See operation 108. For example, a user may have selected the teams from the list or utilizing text.

Additionally, details associated with the identified defect are collected from one or more data sources. See operation 110. The data sources may include any type of data source. For example, collecting the details associated with the identified defect from one or more data sources may include automatically collecting the details from one or more databases or one or more network-based systems.

Further, a description associated with the identified defect is generated utilizing the details associated with the identified defect. See operation 112. In one embodiment, generating the description associated with the identified defect utilizing the details associated with the identified defect may include parsing the collected details and generating the description utilizing the parsed details automatically.

Moreover, the defect ticket is generated for the identified defect utilizing the identified user selected originating team, the identified user selected team in which to assign the identified defect, and the generated description associated with the identified. defect. See operation 114.

In one embodiment, the method 100 may include presenting a plurality of mandatory defect information fields including selectable values for the user to select. Further, the method 100 may include verifying that all the mandatory defect information fields have been populated prior to generating the defect ticket. In various embodiments, the mandatory defect information fields may include fields required for a particular group associated with the software development life cycle and/or required fields to generate the defect ticket.

Utilizing the method 100, a tool (e.g. a user interface, etc.) may be implemented that allows users, such as software testers, to create and submit defects (i.e. issues, bugs, etc.) to any defect tracking system, such as Hewlett-Packard Application Lifecycle Management (ALM) software. The method 100 may be used to populate a defect's detailed information using an algorithm that combines predefined customizable values for logical groups of fields with pre-populating values from various sources such application databases and SharePoint sites, etc., based on the entered criteria, such as a business account number or a test environment name.

The method 100 will reduce the time users spend on logging a defect into a tracking system. Additionally, the method 100 will eliminate potential human errors such as missing a value for a mandatory field and will ensure that all opened defects have the necessary details required to perform an analysis.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Tracking all kinds of defects discovered during a software development life cycle into a tracking system is a common practice for any company involved in development or utilization of software products.

Each tracking system contains multiple fields that have to be populated when logging a defect. Those fields can be divided into three logical groups: 1) originating team/project fields showing by what team and for which project a defect was opened; 2) assigned to team/application fields showing what team a defect should be analyzed/handled by; and 3) summary and description fields describing all the details of the defect that is being logged.

In complex large-scale software projects, one defect tracking system can be used by hundreds of various teams for hundreds of different software projects and applications. Such a tracking system can have a large amount of fields with long lists of valid values a user has to populate to log a defect. Thus, the techniques described herein may be used to employ a tool (e.g. computer code, etc.) for fast, efficient and content verified submission of such defects into any system that tracks software issues.

Figure 2:
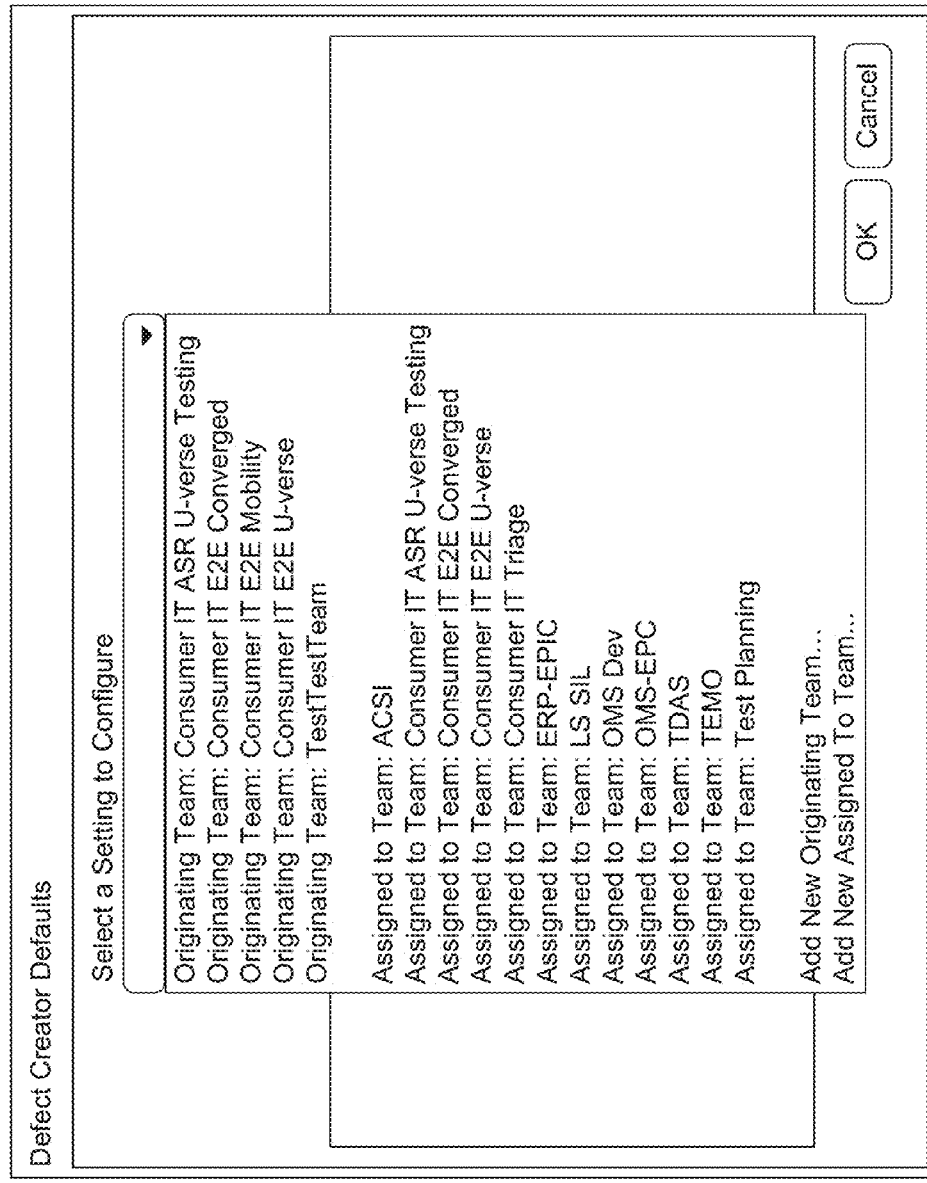
FIG. 2 illustrates a user interface for creating/updating a list of potential originating teams and potential teams in which to assign the identified defect, in accordance with one embodiment.

FIG. 2 illustrates a user interface 200 for automatically creating/updating a list of potential originating teams and potential teams in which to assign the identified defect during a software development lifecycle, in accordance with one embodiment. As an option, the user interface 200 may he implemented in the context of the details of FIG. 1. Of course, however, the user interface 200 may be implemented in the context of any desired environment. Further, the aforementioned definitions may equally apply to the description below.

Utilizing the interface 200, users may first define a list of originating teams and "assign to" teams they regularly use for a software development phase/project they work on and populate default values for all or some of the fields belonging to those groups. If a certain field in the tracking system does not allow free text to be entered but has predefined valid values, only those values may he shown to a user as a possible option for selection.

If text fields have character limits, those limits may be carried over to the tool. When creating a defect using the interface 200, a user may be able to populate "originating from" and "assigned to" fields in bulk by selecting the necessary originating and assign to teams.

FIG. 3 illustrates a user interface 300 for automatically creating and submitting defect information associated with defects identified during a software development lifecycle, in accordance with one embodiment. As an option, the user interface 300 may be implemented in the context of the details of the previous figures. Of course, however, the user interface 300 may be implemented in the context of any desired environment. Further, the aforementioned definitions may equally apply to the description below.

Utilizing the interface 300, as a second step, users may automatically collect details from various sources, including but not limited to databases and SharePoint sites, and populate those details into the defect they open. In one embodiment, databases, URLs and environments may be pre-populated and may be added, removed, or edited at any time. Using input parameters such as an account, scenario, or order number, the tool may be able to query multiple sources to retrieve the relevant details which may then be parsed and added to the defect's summary and description automatically.

In one embodiment, the tool associated with the interfaces 200 and 300 may utilize an algorithm that makes the process of defect submission standardized for all users.

The tool may ensure that all mandatory fields for the ticketing system are populated before a defect is created, even if those fields are not setup as mandatory in the ticketing system, but are required for a certain team, application, or group. The defect summary and description may be created automatically in an easy to read and understandable format that contains all required details necessary to open, analyze and assign the defect.

Thus, the techniques described herein may be utilized to implement a tool that provides a complete, fast and reliable solution for a user to populate all necessary fields with accurate and detailed information when logging a defect found during a software life cycle.

Figure 4:
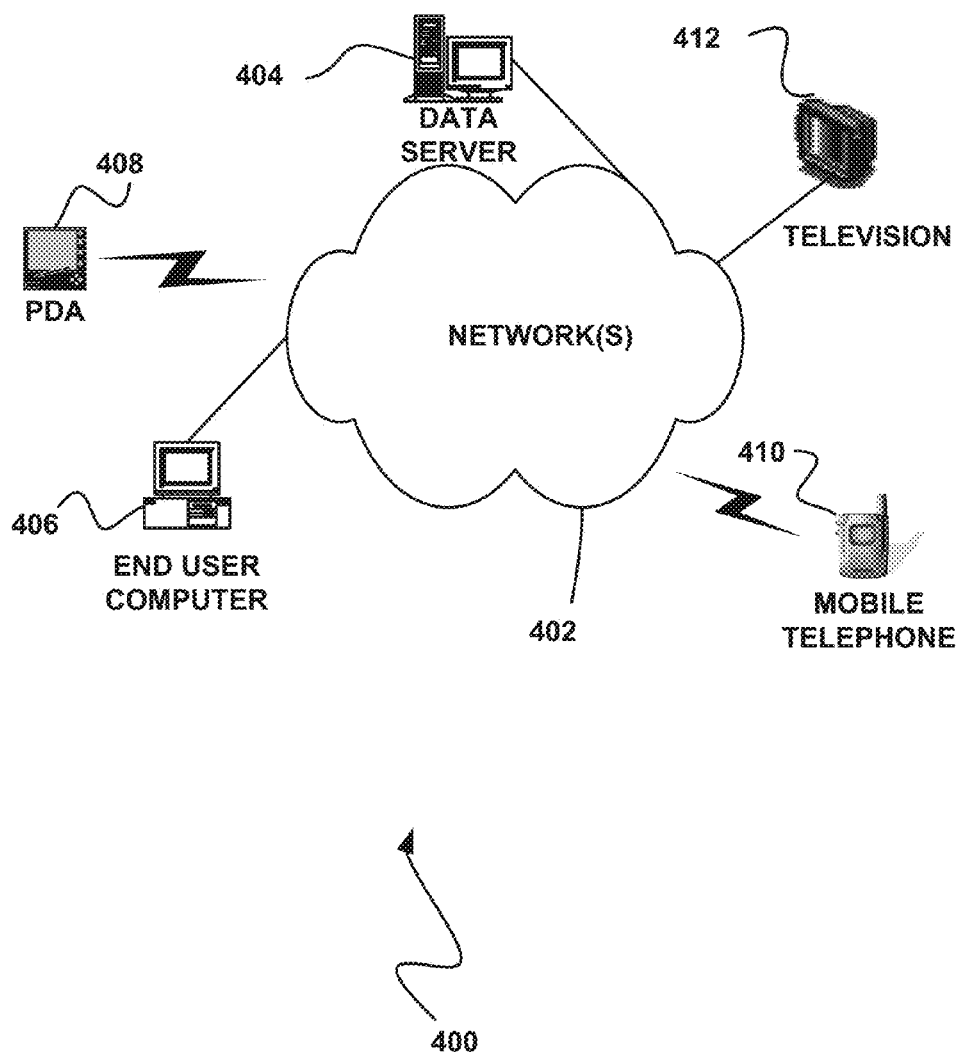
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
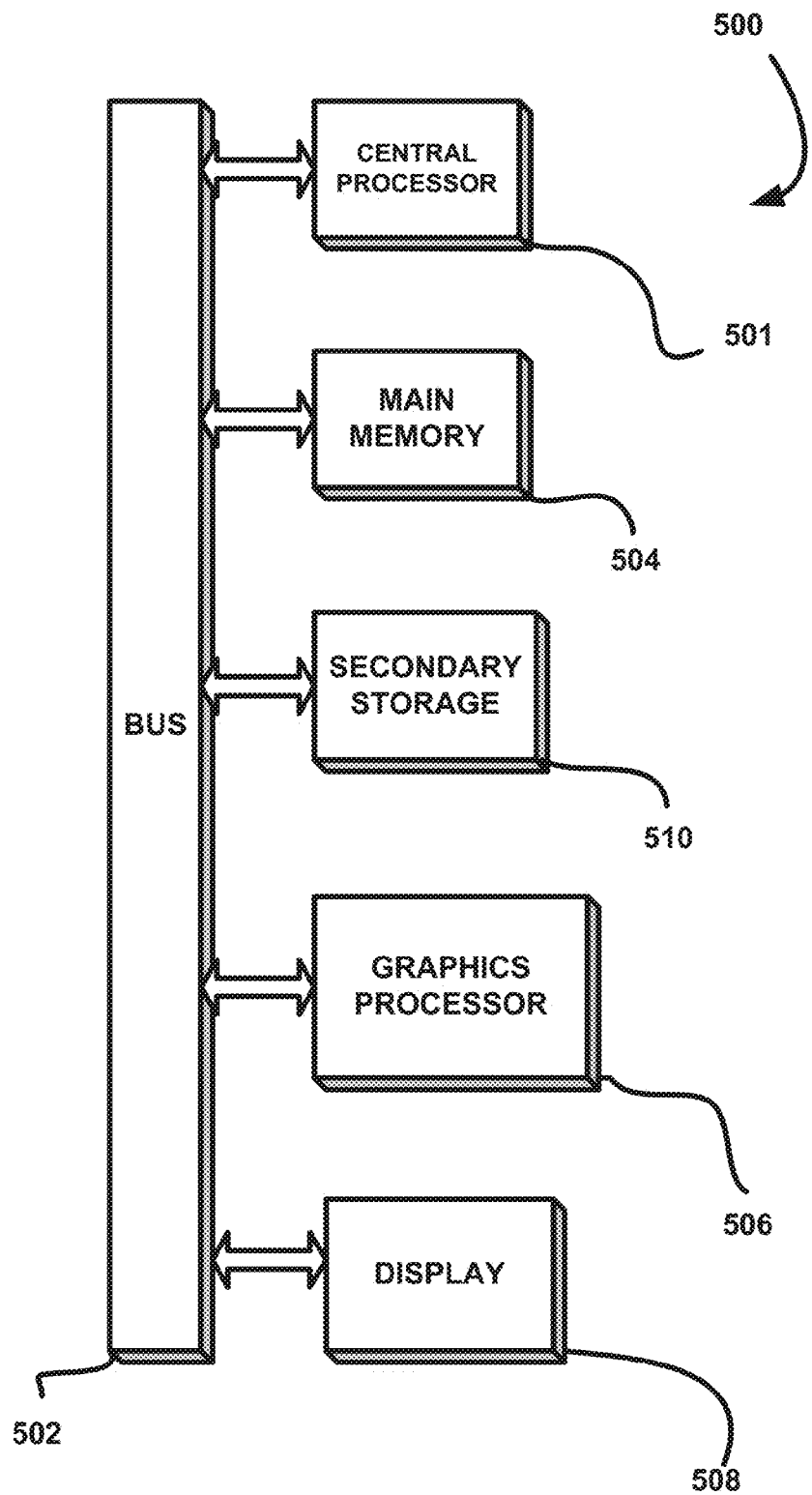
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising computer code for:
    identifying a request from a user to record an identified defect in a predetermined software product;
    in response to the request, presenting to the user a first list of originating teams, the originating teams including a plurality of software development teams;
    receiving from the user a selection of one of the originating teams from the first list, the selection indicating the one of the plurality of software development teams to be responsible for the opening of the identified defect;
    presenting to the user a second list of handling teams, the handling teams including the plurality of software development teams;
    receiving from the user a selection of one of the handling teams from the second list, the selection indicating the one of the plurality of software development teams to be responsible for the analysis of the identified defect;
    presenting to the user a plurality of fields for receiving input parameters from the user;
    receiving from the user the input parameters via the plurality of fields, the input parameters including a business account number. a name of a test environment, and an order number;
    collecting details associated with the identified defect from one or more data sources, including:
        querying a plurality of external data sources with the received business account number, test environment, and order number to retrieve a plurality of details about the identified defect,
        parsing the plurality of details, and
        adding the parsed plurality of details to a summary and description of the identified defect; and
    generating a defect ticket for the identified defect utilizing the selected originating team, the selected handling team, and the summary and description of the identified defect.

2. The computer program product of claim 1, wherein the identified defect includes at least one of an identified issue and an identified bug associated with the predetermined software product in a software development life cycle.

3. The computer program product of claim 1, wherein the list of originating teams includes teams that are regularly used for a software development project.

4. The computer program product of claim 1, wherein the list of handling teams includes teams that are regularly used for a software development project.

5. The computer program product of claim 1, wherein the list of originating teams is presented as a dropdown list allowing selection of one or more specific teams.

6. The computer program product of claim 1, wherein the list of handling teams is presented as a dropdown list allowing selection of one or more specific teams.

7. The computer program product of claim 1, further comprising computer code for presenting an option for a user to generate an originating team not presented in the list of potential originating teams and an option for the user to generate a handling that is not presented in the list of handling teams.

8. The computer program product of claim 1, wherein the plurality of fields are populated utilizing selectable valid values.

9. The computer program product of claim 1, wherein the plurality of fields are populated utilizing text entry.

10. The computer program product of claim 1, further comprising computer code for presenting a plurality of mandatory defect information fields including selectable values for the user to select.

11. The computer program product of claim 10, further comprising computer code for verifying that all the mandatory defect information fields have been populated prior to generating the defect ticket.

12. The computer program product of claim 10, wherein the the mandatory defect information fields include fields required for a particular group associated with the software development life cycle.

13. A method, comprising:
  identifying a request from a user to record an identified defect in a predetermined software product;
  in response to the request, presenting to the user a first list of originating teams, the originating teams including a plurality of software development teams;
  receiving from the user a selection of one of the originating teams from the first list, the selection indicating the one of the plurality of software development teams to be responsible for the opening of the identified defect;
  presenting to the user a second list of handling teams, the handling teams including the plurality of software development teams;
  receiving from the user a selection of one of the handling teams from the second list, the selection indicating the one of the plurality of software development teams to be responsible for the analysis of the identified defect;
  presenting to the user a plurality of fields for receiving input parameters from the user;
  receiving from the user the input parameters via the plurality of fields, the input parameters including a business account number, a name of a test environment, and an order number;
  collecting details associated with the identified defect from one or more data sources, including:
    querying a plurality of external data sources with the received business account number, test environment, and order number to retrieve a plurality of details about the identified defect,
    parsing the plurality of details, and
    adding the parsed plurality of details to a summary and description of the identified defect; and
  generating a defect ticket for the identified defect utilizing the selected originating team, the selected handling team, and the summary and description of the identified defect.

14. A system comprising:
  a memory system; and
  one or more processing cores coupled to the memory system and that are each configured for:
    identifying a request from a user to record an identified defect in a predetermined software product;
    in response to the request, presenting to the user a first list of originating teams, the originating teams including a plurality of software development teams;
    receiving from the user a selection of one of the originating teams from the first list, the selection indicating the one of the plurality of software development teams to be responsible for the opening of the identified defect;
    presenting to the user a second list of handling teams, the handling teams including the plurality of software development teams;
    receiving from the user a selection of one of the handling teams from the second list, the selection indicating the one of the plurality of software development teams to be responsible for the analysis of the identified defect;
    presenting to the user a plurality of fields for receiving input parameters from the user;
    receiving from the user the input parameters via the plurality of fields, the input parameters including a business account number, a name of a test environment, and an order number;
    collecting details associated with the identified defect from one or more data sources, including:
      querying a plurality of external data sources with the received business account number, test environment, and order number to retrieve a plurality of details about the identified defect,
      parsing the plurality of details, and
      adding the parsed plurality of details to a summary and description of the identified defect; and
    generating a defect ticket for the identified defect utilizing the selected originating team, the selected handling team, and the summary and description of the identified defect.

\* \* \* \* \*